(12) United States Patent
Duret

(10) Patent No.: US 10,859,402 B2
(45) Date of Patent: Dec. 8, 2020

(54) ASSEMBLY ON A MEMBER OF A SYSTEM FOR DETERMINING THE POSITION OF SAID MEMBER

(71) Applicant: NTN-SNR ROULEMENTS, Annecy (FR)

(72) Inventor: Christophe Duret, Bluffy (FR)

(73) Assignee: NTN-SNR Roulements, Annecy (FR)

( * ) Notice: Subject to any disclaimer, the term of this patent is extended or adjusted under 35 U.S.C. 154(b) by 37 days.

(21) Appl. No.: 16/038,797

(22) Filed: Jul. 18, 2018

(65) Prior Publication Data

US 2019/0025085 A1  Jan. 24, 2019

(51) Int. Cl.
| | |
|---|---|
| *G01D 15/14* | (2006.01) |
| *G01D 5/14* | (2006.01) |
| *G01D 5/244* | (2006.01) |
| *G01D 5/245* | (2006.01) |
| *H02K 11/215* | (2016.01) |

(52) U.S. Cl.
CPC ............ *G01D 5/145* (2013.01); *G01D 5/2452* (2013.01); *G01D 5/24428* (2013.01); *H02K 11/215* (2016.01)

(58) Field of Classification Search
None
See application file for complete search history.

(56) References Cited

FOREIGN PATENT DOCUMENTS

| | | | | |
|---|---|---|---|---|
| EP | 1353151 A1 | * | 10/2003 | ........... G01D 5/2497 |
| EP | 1353151 A1 | | 10/2003 | |
| EP | 2372313 A1 | | 10/2011 | |
| EP | 2602593 A1 | | 6/2013 | |
| EP | 2602594 A1 | | 6/2013 | |
| FR | 2792403 A1 | | 10/2000 | |
| WO | 2004083881 A1 | | 9/2004 | |

\* cited by examiner

*Primary Examiner* — Jas A Sanghera
(74) *Attorney, Agent, or Firm* — Murtha Cullina LLP

(57) ABSTRACT

The invention relates to an assembly comprising an encoder (1) secured in rotation to the member, said encoder comprising a primary magnetic track (2) and a secondary magnetic track (3) and a sensor (4) having two patterns (5) of sensitive elements which are suitable for detecting the signals supplied by the tracks (2, 3) of the encoder (1), each pattern (5) being arranged at reading distance from a track (2, 3) to form a representative signal of the position of said track, the sensitive elements of a first pattern (5) are based on a magnetoresistive material wherein the resistance varies according to the magnetic signal of the track (2, 3) to be detected, said first pattern being arranged at reading distance from a second track (3) having 2N-1 magnetic pole pairs, the sensitive elements of the second pattern (5) being based on an anisotropic magnetoresistive material, said second pattern being arranged at reading distance from a primary track (2) having N magnetic pole pairs.

8 Claims, 2 Drawing Sheets

0
ASSEMBLY ON A MEMBER OF A SYSTEM FOR DETERMINING THE POSITION OF SAID MEMBER

CROSS-REFERENCES TO RELATED APPLICATIONS

This application claims the priority of French patent application number 17 56826, filed on Jul. 18, 2017, the entire contents of which are incorporated herein by reference.

TECHNICAL FIELD

The invention relates to an assembly on a member of a system for determining the position of said member.

BACKGROUND

In order to determine the position of a member, a system is known comprising:

an encoder intended to be secured to said member, said encoder comprising a primary magnetic track and a secondary magnetic track which are each suitable for emitting a periodic magnetic signal representative of the movement of said encoder; and a sensor having two patterns of sensitive elements which are suitable for detecting the signals supplied by the tracks of the encoder, each pattern being arranged at reading distance from a track to form a representative signal of the position of said track, said sensor further comprising a device for processing the signals from the patterns to determine the position of the member.

In particular, the document EP-1 353 151 envisages that the secondary track comprises a number of magnetic poles which is different from that of the primary track, so as to be able to determine simply the position according to the vernier principle, particularly an absolute position, i.e. with respect to a reference position.

This type of determination systems has the advantage of envisaging a single sensor for reading each of the tracks and for processing the corresponding signals, each pattern being arranged to be suitable for being arranged along a surface which extends at reading distance from the track to be detected.

In particular, so that each of the sensitive element patterns detects a comparable magnetic signal level, said patterns may be arranged along the same reading surface which extends at a substantially constant reading distance with respect to the multipolar magnetic tracks.

This type of determination system finds more particularly the application thereof for the monitoring of synchronous electric motors (with permanent magnet or with wound rotor), particularly for electric vehicles, which need a precise measurement of the position of the rotor in order to handle the stator coil power supply. Alternatively, the system may determine a linear position of a member in translation.

The precision required is conventionally of the order of ±1° electrical, i.e. on a pole pair of the motor. In particular, efficient motor monitoring means:

a superior output and enables:

design of the motor as leanly as possible, i.e. saving on the mass and footprint;

savings of energy and therefore a reduction in the quantity of batteries (mass, cost) for the same autonomy or increased autonomy for the same quantity of batteries;

less heating as there are less losses due to the Joule effect.

superior performances perceived by the user: no torque jumping, starting in the wrong direction, less emitted acoustic noise.

In particular in this type of application, the functional safety of the electric motor monitoring is an increasingly present need. Indeed, the angular determination is used directly in the motor torque control loop: incorrect angle data may result in an incorrect electric motor power supply and therefore untimely movement, potentially serious in the case of an electric vehicle.

The functional safety standard ISO26262 defines these feared events and categorises systems and the components thereof according to ASIL (Automotive Safety Integrity Level) levels from D to A, from the safest to the least safe.

A level D sensor should ensure safe operation but also the failure thereof should be immediately detectable so that the system using same is set to safety mode, for example operating temporarily in degraded mode.

The aim of the invention is that of solving the problems of the prior art by proposing particularly an assembly of a determination system wherein the reliability is enhanced, in particular relative to the likelihood of the complete failure of the sensor and consequently to the detection of any partial failure.

To this end, according to a first aspect, the invention relates to an assembly on a member of a system for determining the position of said member, said assembly comprising:

an encoder secured to said member, said encoder comprising a primary magnetic track and a secondary magnetic track which are each suitable for emitting a periodic magnetic signal representative of the movement of said encoder; and a sensor having two patterns of sensitive elements which are suitable for detecting the signals supplied by the tracks of the encoder, each pattern being arranged at reading distance from a track to form a representative signal of the position of said track, said sensor further comprising a device for processing the signals from the patterns to determine the position of the member;

the sensitive elements of a first pattern being based on a magnetoresistive material wherein the resistance varies according to the magnetic signal of the track to be detected, said first pattern being arranged at reading distance from a second track having 2N−1 magnetic pole pairs, the sensitive elements of the second pattern being based on an anisotropic magnetoresistive material, said second pattern being arranged at reading distance from a primary track having N magnetic pole pairs.

BRIEF DESCRIPTION OF THE DRAWINGS

Further subject matter and advantages of the invention will emerge in the following description, with reference to the appended figures, wherein.

DETAILED DESCRIPTION

Figure 1A:
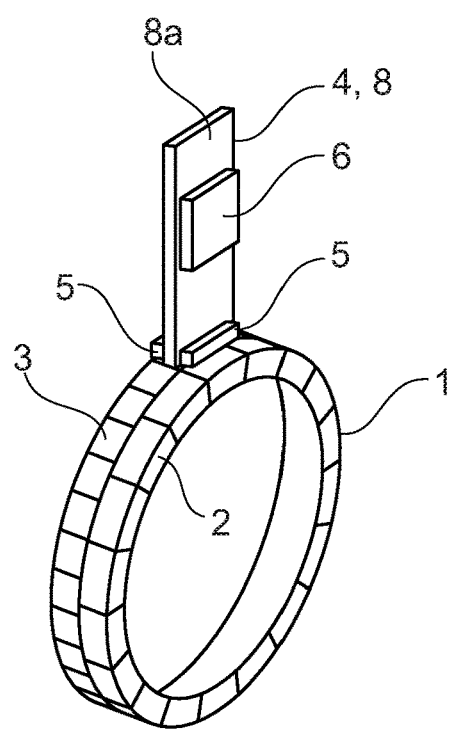
FIGS. 1a to 1c are schematic representations of a radial assembly of a sensor with respect to an encoder according to the invention, respectively in a perspective view (FIG. 1a), side view (FIG. 1b) and front view (FIG. 1c)

With reference to these figures, the assembly on a member of a system for determining the position thereof is described hereinafter. In one application example, the member is rotary, for example by being a shaft of a synchronous electric motor, and the determination of the angular position is used to drive said motor. Alternatively, the system may determine a linear position of a member in translation.

In particular, the position may be determined in absolute terms, i.e. with respect to a reference position, and immediately on powering up the system, without requiring a minimum movement of the member. For this purpose, the determination system comprises an encoder 1 which is secured to the member, said encoder comprising a primary magnetic track 2 and a secondary magnetic track 3.

In particular, the magnetic tracks 2, 3 are multipolar, i.e. they each have an alternating sequence of pairs of North and South poles which extends along the direction of the member. As such, each of the tracks 2, 3 is suitable for emitting a periodic magnetic signal representative of the movement of the encoder 1, particularly a signal of pseudosinusoidal format.

In the embodiments shown, the encoder 1 is formed from a magnet whereon the multipolar magnetic tracks 2, 3 are embodied. In particular, the magnet may be formed from an annular array, for example embodied based on a plastic or elastomer material, wherein are scattered magnetic particles, particularly ferrite or rare earth particles such as NdFeB. Alternatively, each track 2, 3 may be formed on a separate magnet.

The determination system comprises a sensor 4 having two patterns 5 of sensitive elements which are suitable for detecting the signals supplied by the tracks 2, 3 of the encoder 1. In particular, each pattern 5 may comprise at least two sensitive elements, particularly a plurality of aligned sensitive elements as described in the documents FR-2 792 403, EP-2 602 593 or EP-2 602 594.

As such, by arranging the patterns 5 respectively at reading distance from a track 2, 3, it is possible to form a representative signal of the position of said track. Moreover, the sensor 4 comprises a device 6 for processing signals from the patterns 5 to determine the position of the member.

The secondary track 3 comprises a number of pairs of magnetic poles which is different from that of the primary track 2, particularly by envisaging having the poles meet at the start and end points of said tracks, while having an offset of said poles along said tracks.

In particular, for an absolute measurement, the secondary track 3 comprises a number of magnetic pole pairs which does not have a common divisor with that of the primary track 2. According to one embodiment, the tracks 2, 3 extend over 360° to determine the angular position over one revolution. Alternatively, the tracks 2, 3 extend over a portion 1/Q of the revolution to be able to determine the angular position on this portion, the encoder 1 then having particularly a succession of Q tracks 2, 3 over one revolution.

According to one embodiment, the primary track 2 comprises a succession of M pole pairs and the secondary track 3 comprises a succession of M−1 pole pairs.

In this embodiment, as particularly disclosed by the document EP-1 353 151, the processing device 6 may use the magnetic vernier principle to determine the absolute angular position by comparing the angular position signals from each of the patterns 5.

According to a further embodiment disclosed by the document EP-2 372 313, each pattern 5 makes it possible to form a signal which comprises the phase of the angular position of a track 2, 3, the processing device 6 computing a difference between said phases in order to infer the absolute angular position of the encoder 1 therefrom.

The sensitive elements of a first pattern 5 are based on a magnetoresistive material wherein the resistance varies according to the magnetic signal of the track 2, 3 to be detected. Alternatively, the sensitive elements of the first pattern 5 can be based on Hall effect probe.

According to one embodiment, each of the sensitive elements of the first pattern 5 comprises at least one sensitive layer based on a magnetoresistive material, particularly with a tunnel effect, wherein the resistance varies according to the magnetic signal of the track 2, 3 to be detected.

In particular, as described for example in the document WO-2004/083881, each sensitive element of the first pattern 5 comprises a stack of a reference magnetic layer, a separating layer and a magnetic layer sensitive to the field to be detected, the resistance between the magnetic layers being dependent on the relative orientation of the magnetisation thereof.

In this embodiment, the separating layer may be insulating to form a TMR type magnetoresistive element. Alternatively, the separating layer may be conductive to form a GMR type magnetoresistive element.

The sensitive elements of the second pattern 5 are different in nature in respect of the technology for detecting the magnetic signal supplied by the track 3, 2 to be detected. As such, due to the use of two different technologies, the same cause of failure will be less likely to trigger the simultaneous failure of both patterns 5, which is more difficult to detect than a failure of only one of the two patterns 5. Therefore, this results in a functional safety level of the sensor 4 which is enhanced.

The sensitive elements of the second pattern 5 are based on an anisotropic magnetoresistive material, particularly of AMR type.

To form the representative signal of the position of the track 2, 3, each pattern 5 is arranged along a reading surface S which extends at reading distance L from a track 2, 3. In particular, the reading surface S extends with respect to the track 2, 3 along a reading distance L which is substantially constant such that each sensitive element of the patterns 5 can detect a magnetic signal wherein the amplitude is substantially constant.

Furthermore, the patterns 5 may be arranged along the same reading surface S, particularly such that the magnetic tracks 2, 3 extend at the same reading distance L from said patterns. As such, the patterns 5 may detect magnetic signals substantially of the same amplitude, which simplifies the determination of the absolute position by comparing said signals.

Each pattern 5 is arranged such that the sensitive elements extend in a general plane P which is perpendicular to the reading surface S of the track 2, 3. As such, the arrangement of the sensitive elements with respect to the tracks 2, 3 makes it possible to detect the rotating magnetic field which is emitted perpendicularly to said tracks, said detection being less sensitive to the value and to the scatterings of reading distance L than the detection of the magnetic field which is emitted by the tracks 2, 3 along the reading surface S.

Advantageously, the patterns 5 exhibit a length which extends along the magnetic track 2, 3 such that the rotating magnetic field can be detected along said length. Moreover, the tracks 2, 3 exhibit a concentric annular geometry with respect to the axis of rotation of the rotary member.

In the embodiments shown, the sensor 4 comprises an electronic board 8 whereon the processing device 6 is implanted. In particular, the board 8 has two faces 8a, 8b whereon respectively a pattern 5 is arranged. Advantageously, the sensitive elements extend parallel to the faces 8a, 8b whereon they are arranged, which simplifies the integration of the sensor 4, particularly in a small-diameter tube-shaped housing, for the attachment thereof with respect to the encoder 1.

The configuration of the two tracks 2, 3 (particularly relative to the polar length thereof and to the spacing thereof), the two patterns 5 (particularly relative to the spacing thereof) and the relative positioning thereof is designed to prevent inter alia the interference of one track 2 on the other 3 during measurement.

In particular, the two patterns 5 may be spaced axially or radially by placing same on either side of an electronic board 8 wherein the thickness determines this spacing. Optionally, this spacing may be increased by placing the patterns 5 on one or a plurality of additional printed circuits of chosen thickness and by stacking the whole axially or radially.

Furthermore, in order to enhance the functional safety of the sensor 4 further, the patterns 5 may be separated electrically, such that an electrical failure of the power supply of one of these or an electrostatic discharge on the circuit of one of these does not necessarily give rise to failure of the other.

Figure 1B:
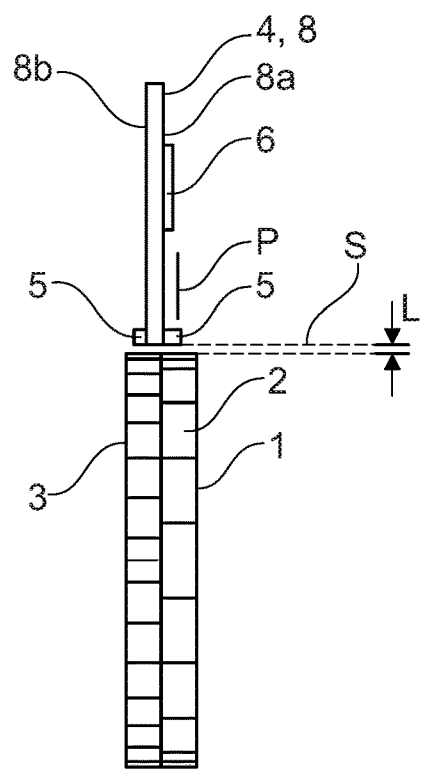

With reference to FIG. 1, the multipolar magnetic tracks 2, 3 are formed along the outer periphery of the annular geometry of the magnet, particularly by being adjacent and axially aligned. The reading surface S extends circumferentially around the periphery by delimiting a substantially constant reading distance L between said surface and the tracks 2, 3.

Figure 1C:
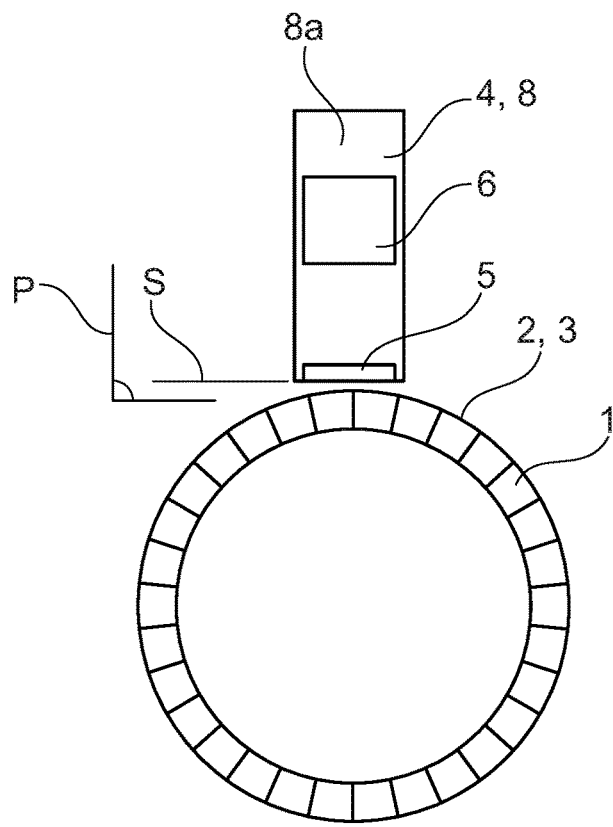

In FIG. 1c, the reading surface S is approximated to the tangent plane to the periphery at the level of the pattern 5, the reading distance L remaining substantially constant along the pattern 5 which extends linearly along said plane.

The electronic board 8 is positioned radially between the tracks 2, 3 with each pattern 5 arranged on either side axially in order to be at radial reading distance from a track 2, 3. Each pattern 5 is arranged such that the sensitive elements have a height which extends radially to enable radial detection of the rotating magnetic field.

Figure 2A:
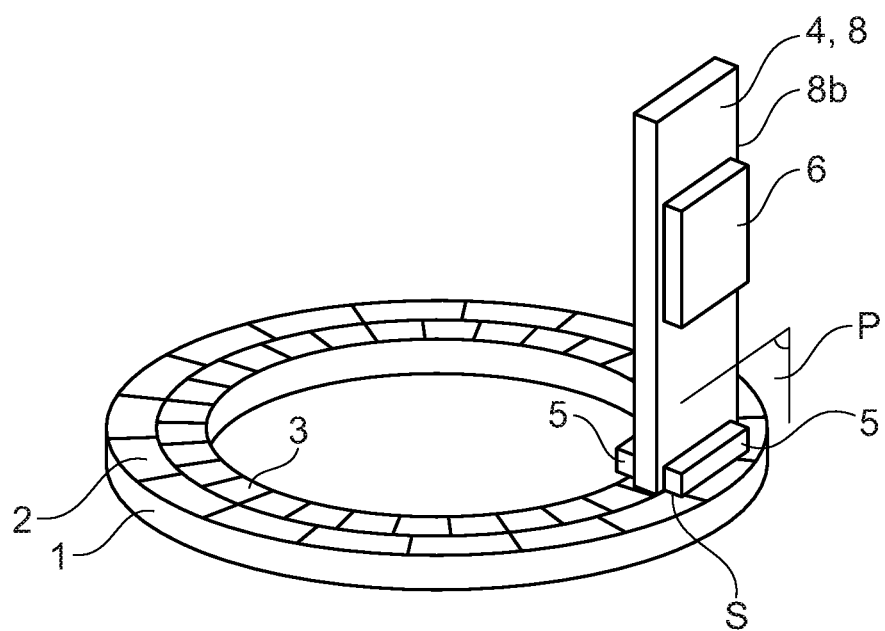
FIGS. 2a and 2b are schematic representations of a facial assembly of a sensor with respect to an encoder according to the invention, respectively in a perspective view (FIG. 2a) and front view (FIG. 2b).
Figure 2B:
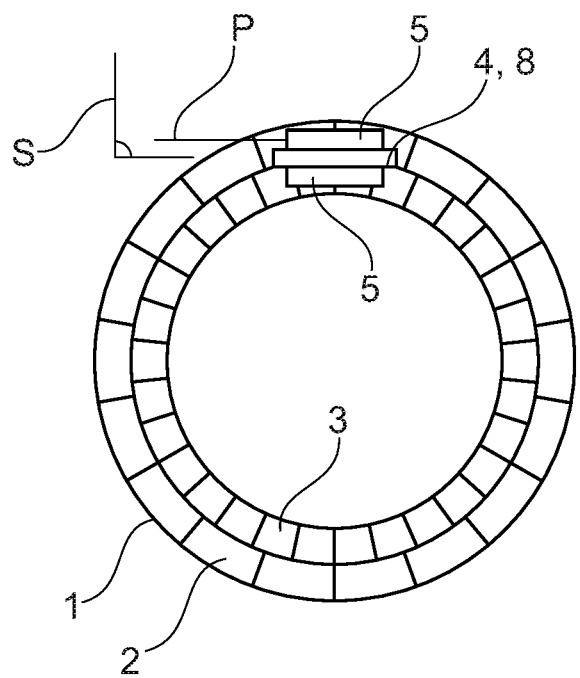

With reference to FIG. 2, the multipolar magnetic tracks 2, 3 are formed on a lateral wall of the annular geometry of the magnet, particularly by being adjacent and radially aligned. The reading surface S extends along a plane parallel with the wall by delimiting a substantially constant reading distance L between said surface and the tracks 2, 3.

The electronic board 8 is positioned axially between the tracks 2, 3 with each pattern 5 arranged on either side radially in order to be at axial reading distance from a track 2, 3. Each pattern 5 is arranged such that the sensitive elements have a height which extends axially to enable axial detection of the rotating magnetic field.

The sensitive elements of the first pattern 5 are based on a magnetoresistive material, for example a tunnel-effect one, particularly TMR, the sensitive elements of the second pattern 5 being based on an anisotropic magnetoresistive material, particularly of AMR type.

One specificity of an AMR pattern is that of doubling the frequency of the magnetic signal measured. As such, as represented in the figures, such that the vernier principle works on a revolution, it is envisaged that the first pattern 5 be arranged at reading distance from the secondary track 3 having 2N−1 magnetic pole pairs, the second pattern 5 being arranged at reading distance from a primary track 2 having N magnetic pole pairs.

As such, an electric signal of the type M/M−1 as described above is indeed obtained to determine the absolute position. In one example of an embodiment, the primary track 2 has 16 pole pairs, the secondary track 3 having 31.

Furthermore, this 2N−1/N configuration makes it possible to benefit from larger poles with regard to AMR patterns, which compensates for the lower sensitivity thereof compared to TMR patterns. As such, an arrangement of each of the patterns 5 at the same reading distance L is possible to be able to determine the absolute position.

What is claimed is:

1. An assembly on a member of a system for determining the position of said member, said assembly comprising:
   an encoder secured in rotation to said member, said encoder comprising a primary magnetic track and a secondary magnetic track which are each suitable for emitting a periodic magnetic signal representative of the movement of said encoder; and
   a sensor having two patterns of sensitive elements which are suitable for detecting the signals supplied by the tracks of the encoder, each pattern being arranged at reading distance from a track to form a representative signal of the position of said track, said sensor further comprising a device for processing the signals from the patterns to determine the position of the member;
   said assembly wherein the sensitive elements of a first pattern are based on a Hall effect probe or a magnetoresistive material wherein the resistance varies according to the magnetic signal of the track to be detected, said first pattern being arranged at reading distance from the secondary magnetic track having 2N−1 magnetic pole pairs, the sensitive elements of a second pattern being based on an anisotropic magnetoresistive material, said second pattern being arranged at reading distance from the primary magnetic track having N magnetic pole pairs.

2. The assembly according to claim 1, wherein the sensitive elements of the first pattern are based on a magnetoresistive material different in nature from that of the sensitive elements of the second pattern in respect of the technology for detecting the magnetic signal supplied by the track to be detected.

3. The assembly according to claim 1, wherein the sensitive elements of the first pattern are based on a tunnel-effect magnetoresistive material, or GMR.

4. The assembly according to claim 3, wherein the sensitive elements of the first pattern comprise a stack of a reference magnetic layer, a separating layer and a sensitive magnetic layer, the sensitive magnetic layer being sensitive to the magnetic field to be detected, the resistance between the reference magnetic layer and the sensitive magnetic layer being dependent on the relative orientation of the magnetisation thereof.

5. The assembly according to claim 1, wherein the encoder is formed from a magnet whereon the primary magnetic track and the secondary magnetic track are embodied.

6. The assembly according to claim 1, wherein the tracks extend over 360° or over a portion of a revolution to determine the angular position of the member over the revolution or over said portion.

7. The assembly according to claim 1, wherein the sensor comprises an electronic board having two faces whereon respectively a pattern is arranged.

8. The assembly according to claim 1, wherein each pattern is arranged such that the sensitive elements extend in a general plane (P) which is perpendicular to a reading surface (S) of the track to be detected.

* * * * *